United States Patent
Roberto

(10) Patent No.: US 9,499,339 B2
(45) Date of Patent: Nov. 22, 2016

(54) AUTOMATED WAREHOUSE SHUTTLE

(71) Applicant: ICAM S.R.L., Putignano (IT)

(72) Inventor: Bianco Roberto, Putignano (IT)

(73) Assignee: ICAM S.R.L., Putignano (IT)

( * ) Notice: Subject to any disclaimer, the term of this patent is extended or adjusted under 35 U.S.C. 154(b) by 0 days.

(21) Appl. No.: 14/894,684

(22) PCT Filed: Jun. 3, 2014

(86) PCT No.: PCT/IB2014/061918
§ 371 (c)(1),
(2) Date: Nov. 30, 2015

(87) PCT Pub. No.: WO2014/195867
PCT Pub. Date: Dec. 11, 2014

(65) Prior Publication Data
US 2016/0107837 A1  Apr. 21, 2016

(30) Foreign Application Priority Data

Jun. 3, 2013 (IT) .............................. TO2013A0452

(51) Int. Cl.
*B65G 1/04* (2006.01)
(52) U.S. Cl.
CPC ........... *B65G 1/0492* (2013.01); *B65G 1/0414* (2013.01)
(58) Field of Classification Search
CPC .......................... B65G 1/0492; B65G 1/0414
USPC ................................................ 414/279, 281
See application file for complete search history.

(56) References Cited

U.S. PATENT DOCUMENTS

| 3,848,755 | A | * | 11/1974 | Bussienne | ............ | B65G 1/0414 |
| | | | | | | 414/279 |
| 4,345,524 | A | | 8/1982 | Loomer | | |
| 4,459,078 | A | * | 7/1984 | Chiantella | ............ | B65G 1/0414 |
| | | | | | | 414/279 |
| 5,333,982 | A | * | 8/1994 | Tanizawa | ............ | B65G 1/0492 |
| | | | | | | 191/29 R |
| 5,370,492 | A | * | 12/1994 | Gleyze | ................ | B65G 1/0492 |
| | | | | | | 414/279 |
| 6,149,366 | A | * | 11/2000 | Deandrea | ............ | B65G 1/0492 |
| | | | | | | 414/279 |
| 7,131,811 | B2 | * | 11/2006 | Melin | .................... | B65G 1/065 |
| | | | | | | 414/277 |

FOREIGN PATENT DOCUMENTS

| AT | DE 202015104093 U1 | * | 8/2015 | ........... B65G 1/0492 |
| EP | 2404848 A1 | | 1/2012 | |
| FR | 2730715 A1 | * | 8/1996 | ........... B65G 1/0492 |
| NL | EP 2818432 A1 | * | 12/2014 | ........... B65G 1/0492 |
| WO | 2005/077789 A1 | | 8/2005 | |

OTHER PUBLICATIONS

PCT, International Search Report and Written Opinion, International Application No. PCT/IB2014/061918 (Sep. 12, 2014).

* cited by examiner

*Primary Examiner* — Kaitlin Joerger
(74) *Attorney, Agent, or Firm* — Thompson Hine LLP

(57) ABSTRACT

An automated warehouse shuttle has a frame and an upper surface, which is adapted to support a loading unit, and is actuated by an actuating device to be lifted/lowered with respect to the frame; the frame supports a first set of wheels consisting of wheels defining resting points at a first level and are configured so as to roll along a first and a second directions, which are horizontal and orthogonal to each other; furthermore, the frame supports a second set of wheels constituted by wheels which define resting points at a second level, higher than the first, and are configured so as to roll along the first direction.

4 Claims, 3 Drawing Sheets

AUTOMATED WAREHOUSE SHUTTLE

CROSS-REFERENCE TO RELATED APPLICATIONS

This application is a National Stage filing of International Application No. PCT/IB2014/061918, filed Jun. 3, 2014, which claims priority of Italian Application No. TO2013A000452, filed Jun. 3, 2013, which are incorporated herein by reference in their entireties.

TECHNICAL FIELD

The present invention relates to an automated warehouse shuttle.

BACKGROUND ART

Patent Application WO2005077789A1 by the same Applicant, discloses an automated warehouse, comprising a fleet of shuttles which are remote-controlled by a central control unit so as to travel in a metal structure having a plurality of accumulation aisles, in which loading units, e.g. pallets, are stored.

When empty, the shuttles can pass underneath the pallets and travel in the accumulation aisles and also in orthogonal direction in service aisles, which are free from pallets and are arranged at the ends of the accumulation aisles.

In a different type of warehouse, each shuttle is replaced by a combination of a "parent" vehicle and a "satellite" vehicle. The parent vehicle is unidirectional and travels along a service aisle and supports the "satellite" vehicle. The latter, instead, can leave the parent vehicle, so as to travel along the accumulation aisles and load/unload the pallets.

In some known solutions related to the latter type of warehouses, the side edges of the pallets are supported by horizontal brackets, each of which is made in one piece with a respective runway, on which the wheels of the vehicle satellite can rest and roll, so as to form a metal section having a substantially Z-shape cross-section.

In this case, the construction and assembly of the runways for the satellite vehicle in the accumulation aisles is extremely simple and cost-effective, and consequently the warehouse structure is extremely advantageous.

In light of these advantages, the need is felt to use a warehouse structure of this type, with a single shuttle instead of necessarily requiring a satellite vehicle and a parent vehicle separated from each other.

DISCLOSURE OF INVENTION

It is the object of the present invention to make an automated warehouse shuttle, which allows, in simple, cost-effective manner, to solve the aforesaid need, and which can travel within the aisles of the warehouse in reliable manner, preferably without the need of making changes to the metal structures which are normally used.

According to the present invention, an automated warehouse shuttle is made.

BRIEF DESCRIPTION OF DRAWINGS

The invention will now be described with reference to the appended drawings which illustrate a non-limitative embodiment thereof, in which.

BEST MODE FOR CARRYING OUT THE INVENTION

Figure 1:
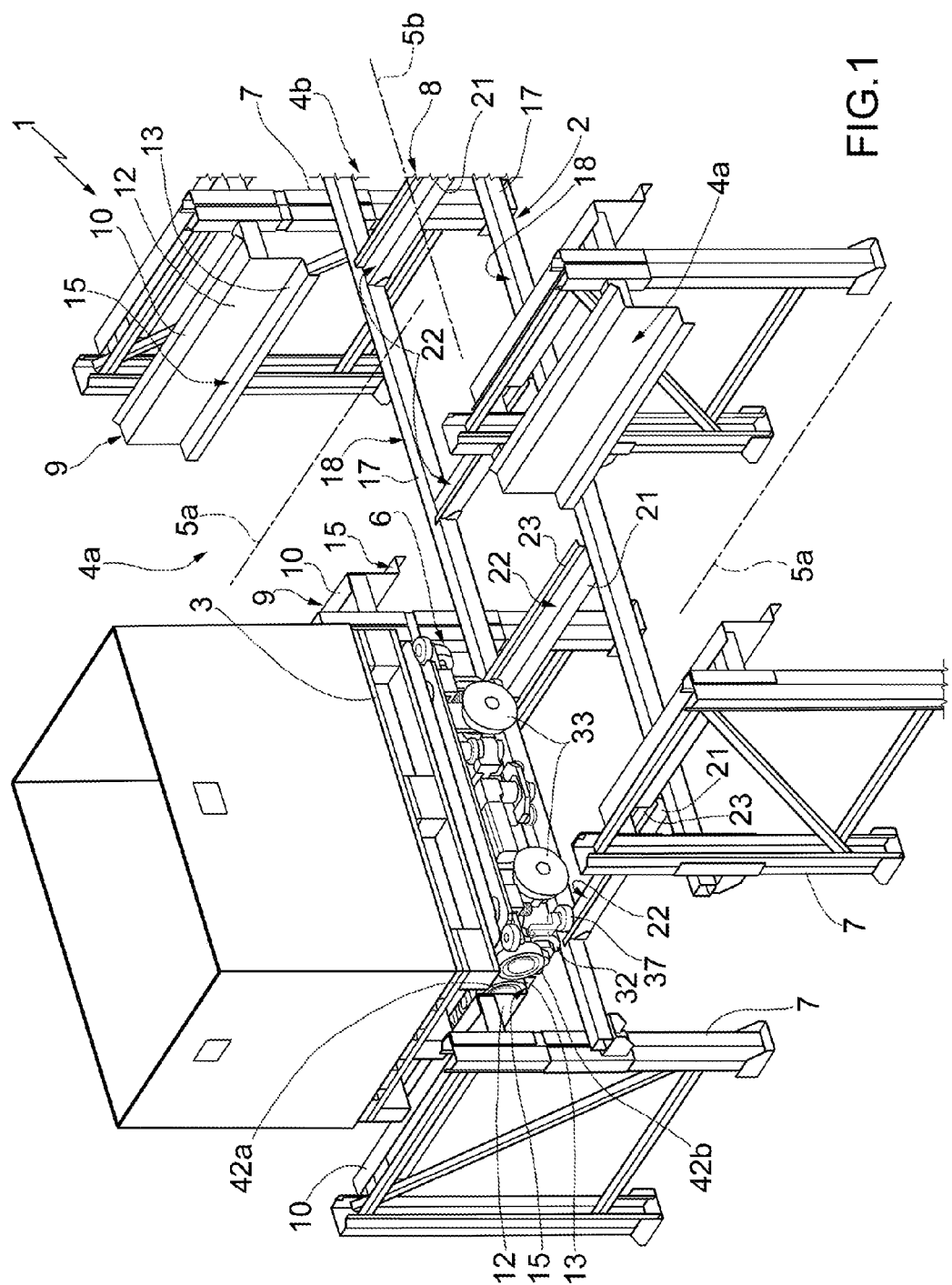
FIG. 1 is a perspective view of a shuttle in an automated warehouse, according to the present invention.

In FIG. 1, reference numeral 1 indicates, as a whole, an automated warehouse (partially shown) comprising a fixed structure 2, which preferably defines a plurality of superimposed floors, on which loading units 3, for example pallets, are stored. Each floor of the warehouse 1 consists of a plurality of aisles, which extend along reciprocally orthogonal directions and are, in use, covered by a fleet of shuttles 6 (only one of which is shown). In particular, the expression "shuttle" means a single vehicle on wheels, which is remote-controlled by a central control unit (not shown) or by means of a manual remote control (not shown) so as to travel along the aisles, and preferably also in the surrounding areas around the structure 2, to pick, transfer and deposit the loading units 3 in automated manner.

With regards to aisles of the structure 2, there are accumulation aisles 4 which extend along directions 5a and where the loading units 3 are stored; and service aisles 4b, which are free from loading units, extend along directions 5b orthogonal to directions 5a and are arranged at the ends of the accumulation aisles 4a.

Warehouse 1 preferably comprises one or more lifting devices, e.g. an elevator or fork-lift truck (not shown), to transfer the shuttles 6 from each floor to the others.

Again with reference to FIG. 1, structure 2 preferably comprises: a plurality of vertical uprights 7; a horizontal frame 8 fixed to the uprights 7 in each service aisle 4b; and, in each accumulation aisle 4a, two horizontal supporting elements 9, which are preferably defined by metal sections parallel to the direction 5a, fixed to the uprights 7 (in known and not described in detail manner), arranged along the opposite sides of accumulation aisle 4a and thus are transversely spaced apart to allow the passage of the shuttle 6.

The two elements 9 comprise respective horizontal brackets or wings 10, on which the side edges of the loading unit 3 rest in use. At the same time, the elements 9 have a substantially Z-shaped cross-section so as to comprise respective substantially vertical walls 12 and respective horizontal wings 13, which are arranged at a height lower than the wings 10, are joined to the latter by means of the walls 12, protrude in cantilever manner in the accumulation aisle 4 from a lower edge of the walls 12 and define respective horizontal runways 15 on their upper faces.

On the other hand, frame 8 comprises two parallel rails 17, which are parallel to direction 5b, are transversely spaced apart, extend for the entire length of the corresponding service aisle 4b and define respective horizontal runways 18 on their upper faces.

At each junction between accumulation aisles 4a and service aisles 4b, frame 8 comprises a pair of rails 21, which are parallel to direction 5a, are transversely spaced apart, extend for the entire width of the service aisle 4b and define respective horizontal runways 22, which are coplanar with the runways 18, on their upper faces. In particular, in the illustrated solution, the runways 22 end at the outer side edges of the rails 17.

Figure 2:
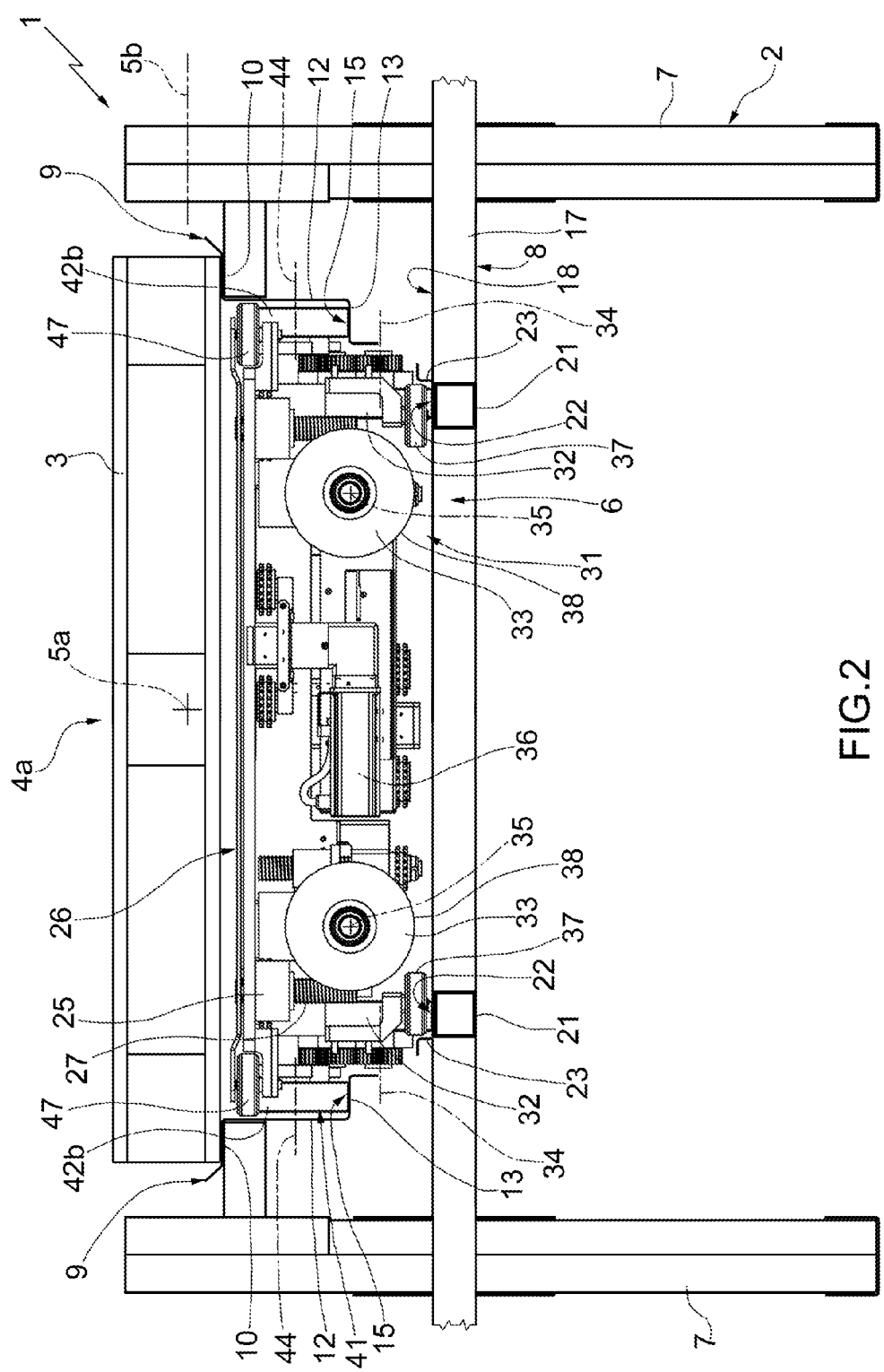
FIG. 2 is a side view, on a enlarged scale, of the shuttle in FIG. 1.

As shown in FIG. 2, rails 21 support respective vertical walls 23, which protrude upwards with respect to the runways 22 and extend along an edge of the runways 22, in particular the outer side edge, for the entire width of the service aisle 4b, except for the zones in which the runways 18 are provided.

Each shuttle 6, when it is empty and travels along the accumulation aisles 4, has a height lower than the vertical distance between the upper face of the wings 10 and the runways 22, so as to be able to pass without interference under of the loading unit 3 which are arranged resting on the wings 10.

Shuttle 6 is substantially parallelepiped-shaped and comprises a frame 25 and an upper loading surface 26, which is vertically moveable with respect to frame 25 under the bias of an actuating device 27 (partially shown) between a lowered position (FIG. 2) and a lifted position (not shown) so as to deposit and pick a loading unit 3.

Furthermore, shuttle 6 comprises an electronic unit, for example of the PLC type (not shown), which receives wireless control signals emitted by the central control unit of the warehouse 1 and, according to these signals, controls, in turn, the device 27 and/or a motor assembly provided to displace the shuttle 6 along directions 5a and 5b, so as to reach the destinations in the warehouse 1 established by the central control unit.

Still with reference to FIG. 2, shuttle 6 comprises a set of wheels 31 supported by the frame 25 and configured so as to allow the shuttle 6 to travel along the runways 22 and 18. In the particular embodiment illustrated, the set of wheels 31 consists of four wheels 32 and four wheels 33, all of the non-steering type, which are rotatable about respective axes 34 and 35, orthogonal to directions 5a and 5b, so as to roll along such directions, respectively. Preferably, all the wheels 32 and 33 are motor-driven by means of the motor assembly of the shuttle 6 (in manner not shown in detail).

The relative vertical position between the axes 34 and 35 is adjustable by means of an actuating device 36, so as to make the wheels 32 or the wheels 33 rest on the frame 8, and thus activate the displacement along direction 5a or along direction 5B. In particular, the axes 34 are fixed with respect to frame 25, while the axes 35 may be displaced vertically with respect to frame 25.

Therefore, the wheels 32 and 33 define respective resting points which are arranged at the level of runways 22 and 18 and become selectively active as a function of the direction to be traveled.

Each wheel 32 is associated to two rolls 37, which are rotatable about respective vertical axes and arranged at the same height as the walls 23 when the wheels 32 rest on the runways 22. The width of the shuttle 6 defined by the rolls 37 parallel to direction 5b is slightly smaller than the distance between the walls 23: the latter perform a guiding function along the direction 5a and a containing function in the case of possible lateral swerving of the shuttle 6.

Figure 3:
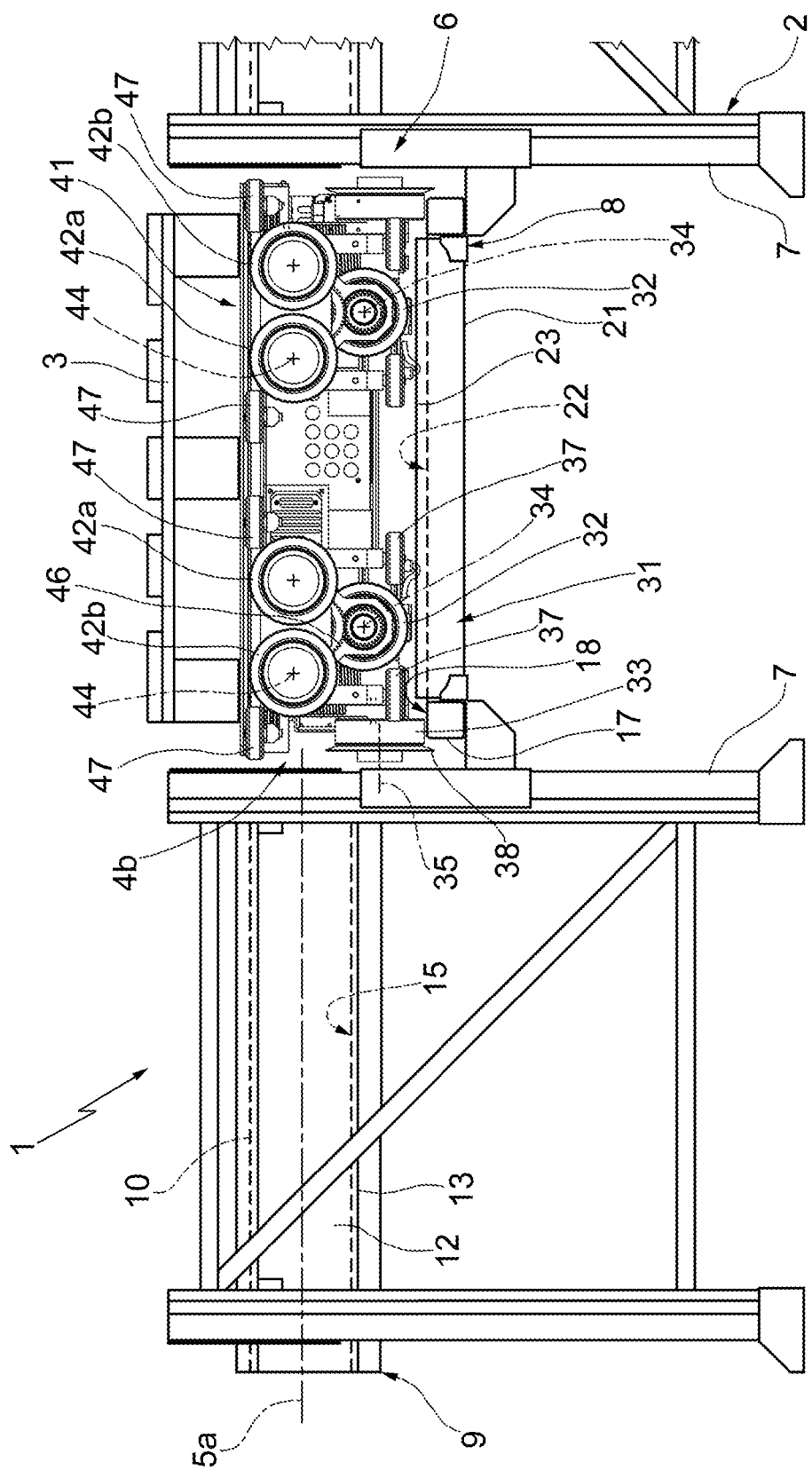
FIG. 3 is a front view of the shuttle in FIG. 1, shown in a different position in the warehouse and at a different operating condition.

As shown in FIG. 3, the guiding function along the direction 5b is instead performed by the sides of the rails 17 and from a flange 38 which projects radially with respect to the wheels 33.

According to an alternative (not shown), the set of wheels 31 consists of a single set of four wheels, which are steering about respective vertical axes by an angle equal to 90°. Steering is carried out when the shuttle 6 is stationary at one of the junctions between aisles 4a and 4b, i.e. when the four wheels are at the junctions between the runways 18 and 22.

Also in this case, the set of wheels 31 defines four resting points at the level of the runways 18 and 22 and is configured so as to travel in orthogonal directions.

Considering a given floor of the warehouse 1, the runways 22 are arranged at a height lower than the runways 15 and are only provided at the junctions. The sections 9 support the shuttle 6 in the remaining part of the accumulation aisles 4a.

Indeed, according to the present invention, shuttle 6 comprises a set of wheels 41, which is additional to the set of wheels 31, is also supported by the frame 25 and defines resting points which are arranged at the height of the runways 15, i.e. at a level higher than the resting points defined by the set of wheels 31.

The set of wheels 41 preferably consist of four pairs of wheels 42 and 42b. The wheels 42,42b rotate about axes 44 orthogonal to the direction 5a and are arranged half on one side and half on the other side of the shuttle 6.

As shown in FIGS. 2 and 3, on each side, the wheels 42a and 42b are reciprocally aligned and arranged more outwards than the wheels 32, because the runways 15 define a wider track than that defined by the runways 22.

The axes 44 are arranged higher than the axes 34; at the same time, the diameter of the wheels 42a,42b is substantially equal to that of the wheels 32 and are actuated by the motor assembly of the shuttle 6 at the same rotation speed as the one of the wheels 32. For example, the motor assembly comprises toothed transmissions 46 which transmit the motion from wheels 32 to wheels 42.

It is possible to make wheels 42a,42b with a smaller diameter than that of the wheels 32, but in this case the transmission ratio of the motor assembly (in particular the toothed transmissions 46) has to vary so as to keep the same peripheral traction speed on the runways 15 and 22. In this case, the axes 44 may be arranged lower than shown.

Preferably, shuttle 6 comprises, for each a pair of wheels 42a and 42b, a respective pair of rolls 47, which are idly rotatable about respective vertical axes and are arranged at the same height as the walls 12, on opposite sides of the pair of wheels 42a,42b. Obviously, the number and/or position of the rolls 47 or the method adopted for centering the shuttle 6 in transverse direction may be different from what shown by way of example.

As shown in FIG. 2, the width of the shuttle 6 as defined by the rolls 47 parallel to direction 5b is slightly smaller than the distance between the walls 12; and the latter perform a guiding function along direction 5a and a containing function in case of possible lateral swerving of the shuttle 6 when the wheels 42a,42b rest on the runways 15.

As an alternative to the rolls 47, for centering the accumulation aisles 4, the wheels 42a,42b could be provided with respective circular flanges which protrude radially and face the inner edges of the walls 13.

Advantageously, each of the wheels 32 is arranged in an intermediate position between a wheel 42a and a wheel 42b along the direction 5a. In particular, reference numeral 42a indicates the innermost wheel, while reference numeral 42b indicates wheel closest to the end of the shuttle 6.

In this manner, traveling along direction 5a and moving away from the junction, the two wheels 42b rest and start rolling on the runways 15 when the four wheels 32 still rest on the runways 22. When the first two wheels 32 leave the runways 22, the shuttle 6 remains supported in part by the runways 15 and in part by the runways 22 and continues its trajectory. When the other two wheels 32 must leave the runways 22, all four wheels 42a already rest and roll on the runways 15. It derives that the transfer from the runways 22 to the runways 15 does not imply any problem of support or balance of the shuttle 6.

The same applies to the transfer in the opposite direction, i.e. approaching the junction (FIG. 1). Indeed, the first two wheels 32 rest and start rolling on the runways 22 when the wheels 42a still all rest on the runways 15; and, when the wheels 42b must leave the runways 15, the wheels 32 already all rest on the runways 22.

According to a variant (not shown), the wheels 42a and 42b are replaced by a single set of four wheels, rotational about respective axes 44, for example with the same center distance between the axes 34. In this case, in order to have a stable rest for the shuttle 6 in all instants during the transfer between the runways 22 and 15, the runways 22 may be extended beyond the junction so as to have the simultaneous presence of the runways 22 and 15 for a given stretch of the accumulation aisle 4a.

From the above, it is apparent that the shuttle 6 is defined by a single vehicle, i.e. not defined by the combination of a parent vehicle and a satellite vehicle, but can travel along accumulation aisles 4a provided with section elements, in which the runways 15 are made in one piece with the brackets 10 for resting the loading unit 3. In other words, the shuttle 6 is compatible with structure 2 which is normally designed for warehouses in which parent vehicles travel with satellite vehicles and not with single shuttles.

The shuttle 6 is reliable in the passage between the runways 15 and 22, in particular by virtue of the number and position of the wheels 42a,42b. In other words, the features of the shuttle 6 allow to avoid noise and jamming at the junctions.

At the same time, the shuttle 6 has a relatively low number of additional components with respect to the single shuttles of known type, and does not require radical interventions on the structure 2 with respect to that already known.

Finally, from the above, it is apparent that changes and variations may be made to the described shuttle 6 without departing from the scope of protection of the present invention, as defined in the appended claims.

In particular, as mentioned above, the number and position of the wheels of the set of wheels 31 and 41 may be different from that shown by way of example; and/or the motorization of the wheels 42a,42b may be different from that of toothed transmissions 46.

It is then apparent that the features of the shuttle 6 do not closely depend on the constructive features and on the drawing of the structure 2, but depend only on the relative position of the runways 15 and 22. By way of example, alternatively to what shown, the horizontal supporting elements 9 could have a different shape, and/or be constructed by a different number of parts and/or be coupled by the uprights 7 in a different manner.

The invention claimed is:

1. An automated warehouse shuttle comprising:
   a frame;
   an upper surface adapted to support a loading unit;
   actuating means for lifting and/or lowering said upper surface with respect to said frame;
   a first set of wheels consisting of wheels which are supported by said frame, are rotatable about first horizontal axes, are configured so as to roll along a first and a second direction, horizontal and orthogonal to each other, and define resting points arranged at a first level; characterized by comprising a second set of wheels consisting of wheels which are supported by said frame, are rotatable about second horizontal axes, are configured so as to roll along said first direction, and define resting points arranged at a second level higher than said first level.

2. A shuttle according to claim 1, characterized in that the wheels of said second set of wheels are all motor-driven.

3. A shuttle according to claim 1, characterized in that said second set of wheels comprises at least four wheels, which are arranged a half on one side and a half on the other side of said shuttle and define a wheel track greater than that defined by corresponding wheels belonging to said first set of wheels.

4. A shuttle according to claim 1, characterized in that said second set of wheels comprises four pairs of wheels; each pair consisting of a front wheel and a rear wheel, which are aligned in a direction parallel to said first direction; said first set of wheels comprising at least four wheels, each of which is arranged in an intermediate position between one said front wheel and one said rear wheel, considering a direction parallel to said first direction.

* * * * *